Aug. 8, 1950 N. B. WEYAND 2,518,408
TENSION TESTING APPARATUS
Filed April 10, 1947 3 Sheets-Sheet 1
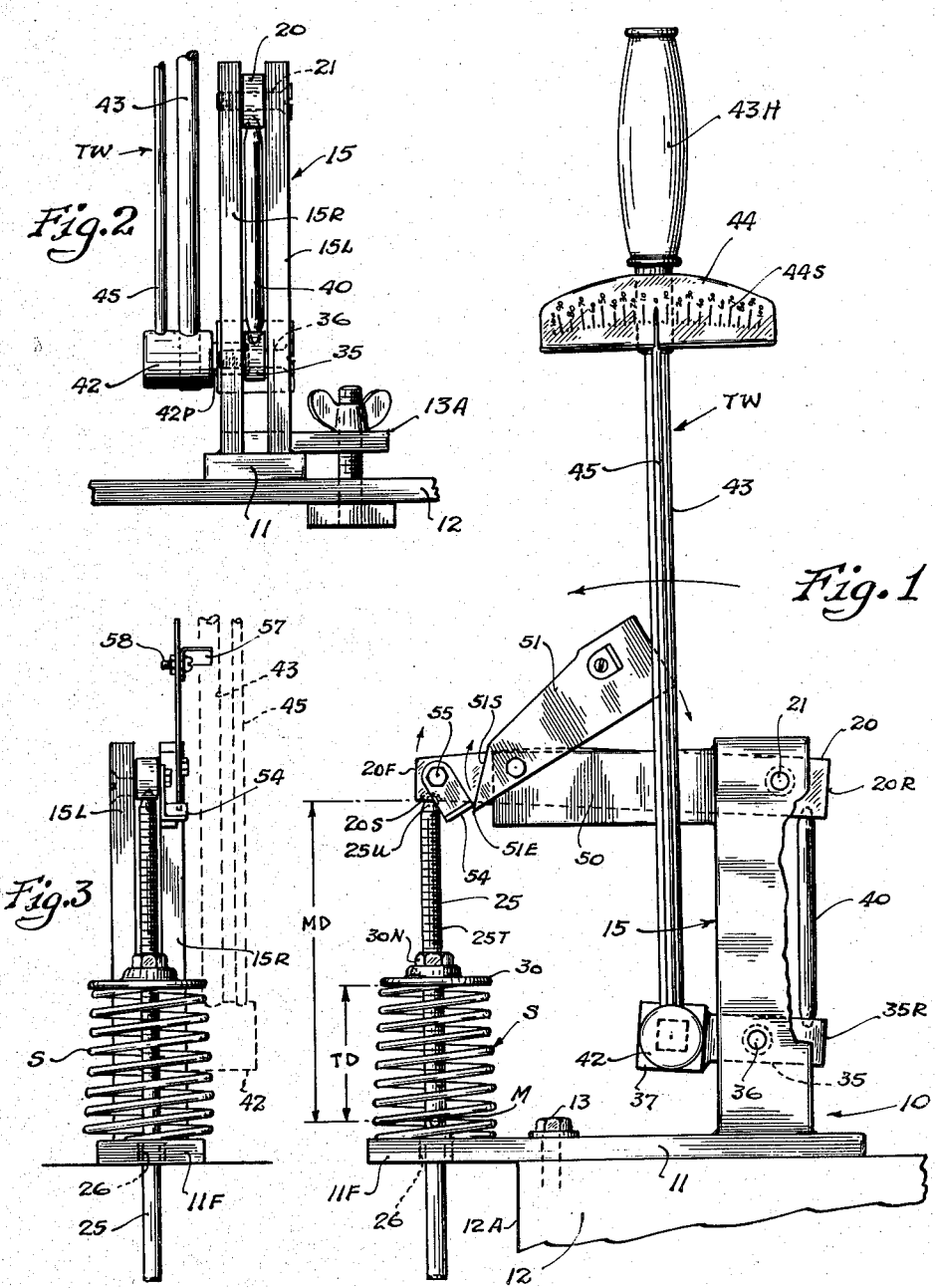
INVENTOR.
Norman B. Weyand
BY Fred Bing
ATTORNEY Aug. 8, 1950   N. B. WEYAND   2,518,408
TENSION TESTING APPARATUS
Filed April 10, 1947   3 Sheets-Sheet 2
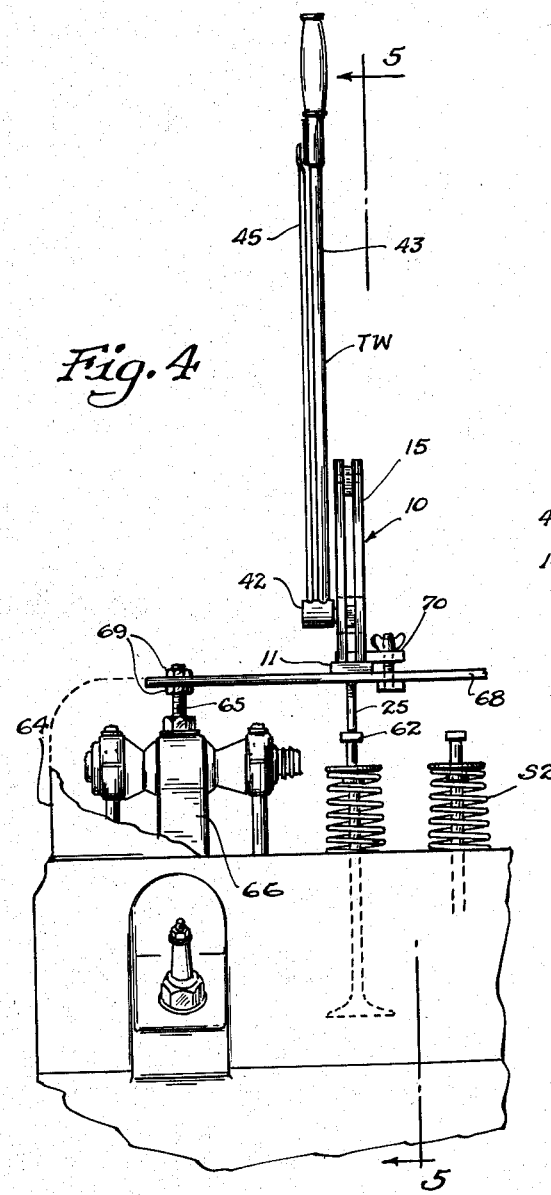
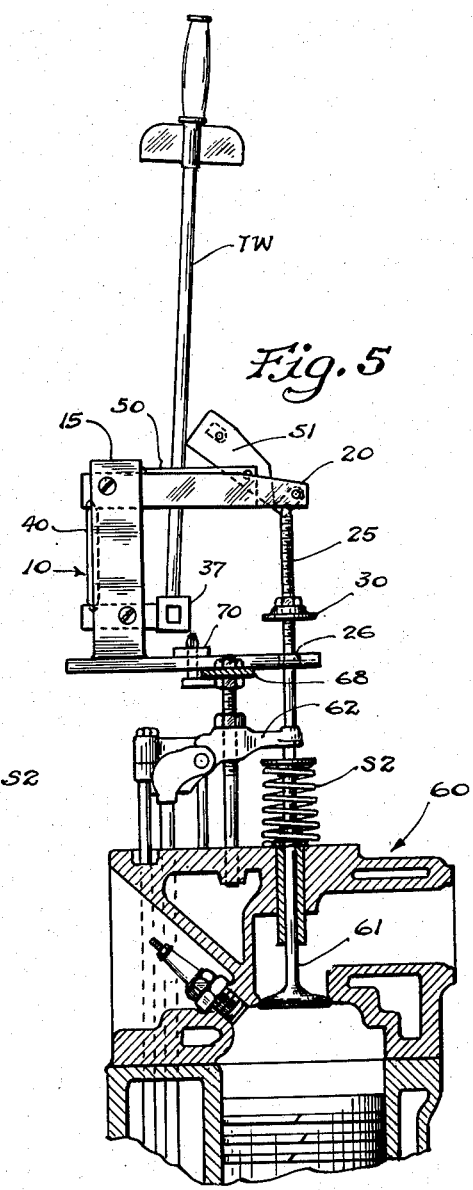
INVENTOR.
Norman B. Weyand
BY Fred Bing
ATTORNEY Aug. 8, 1950     N. B. WEYAND     2,518,408
TENSION TESTING APPARATUS
Filed April 10, 1947     3 Sheets-Sheet 3
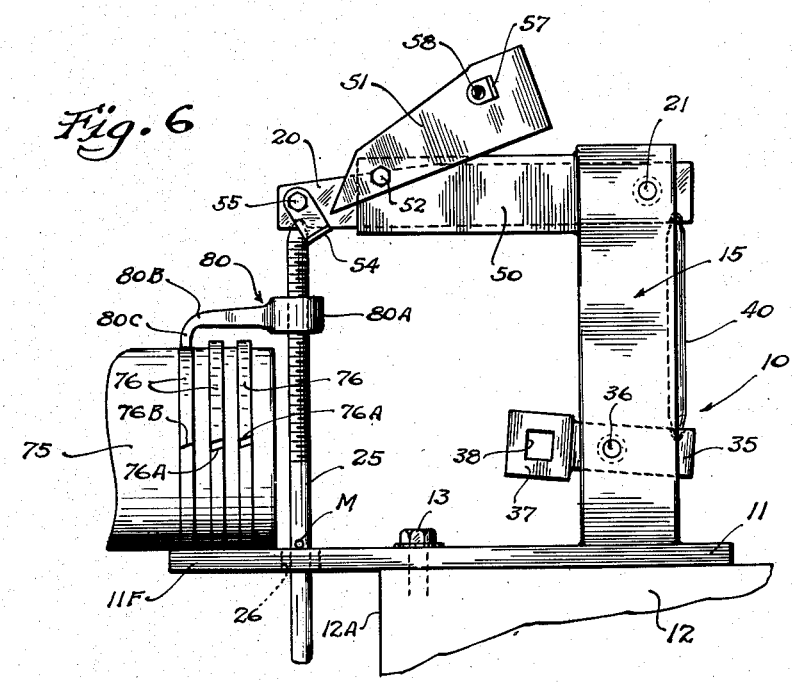
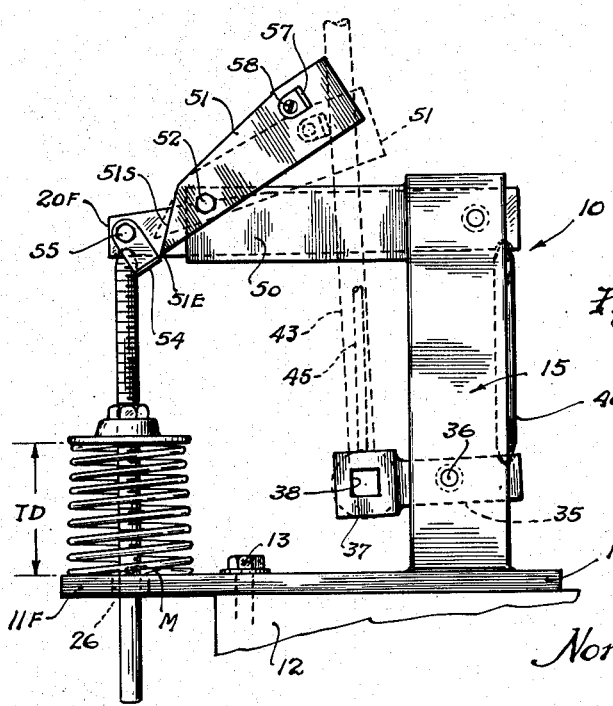
INVENTOR
Norman B. Weyand
BY Ferd King
ATTORNEY Patented Aug. 8, 1950

2,518,408

UNITED STATES PATENT OFFICE 2,518,408

TENSION TESTING APPARATUS

Norman B. Weyand, Lincoln, Nebr.

Application April 10, 1947, Serial No. 740,664

4 Claims. (Cl. 73—161)

This invention relates to tension testing apparatus and particularly to apparatus of this character for testing the tension of resilient machine parts such as valve springs, piston rings and the like.

In machine and auto repair shops it is often necessary to test the tension characteristics of resilient machine elements such as valve springs and piston rings, and in the past it has been necessary for such shops to have separate tension testing apparatus for performing the tests with respect to these two different machine elements. It is therefore an important object of the present invention to enable the same apparatus to test either valve springs or piston rings, and a related object is to afford such apparatus that is simple and effective in its operation.

The tests that are specified for both piston rings and valve springs are similar in character in that in each instance a particular minimum tension is required in the element when it is compressed to a predetermined size or relation, and a further object is to simplify the determination of the tension of the element when such element has been compressed to the desired tension or relation. More specifically it is an object of the present invention to afford means which operates at the time when such predetermined size or relation is attained to check or stop the movement of the torque or pressure applying means so as to thereby simplify the reading of the pressure required to attain such size or relation.

In the testing of valve springs it is often desirable to perform the tests while the springs are in place in the motor and at the ordinary operating or working temperatures, and another object of the invention is to enable this to be accomplished. A related object is to enable the same testing apparatus to be used for bench testing of valve springs or piston rings or for testing of valve springs while they are in place in the motor.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a testing apparatus embodying the invention and mounted on a work bench;

Fig. 2 is a fragmentary rear view of the testing apparatus;

Fig. 3 is a fragmentary front view of the testing apparatus;

Fig. 4 is a view of the apparatus in position on a motor block for testing of a valve spring in position in the motor;

Fig. 5 is a sectional view taken along the line 5—5 of Fig. 4;

Fig. 6 is a side elevational view showing the device as used on a bench for testing piston rings; and Fig. 7 is a view similar to Fig. 1 and showing the parts in the positions which they assume as the test operation is completed.

For purposes of disclosure the invention is herein illustrated as embodied in a tension testing apparatus 10 having a flat base 11 adapted to be secured in position on a work bench 12 or other support by means such as one or more cap screws or bolts 13, as shown in Fig. 1 or by means such as a clamp 13A, as shown in Fig. 2, and when so mounted one end 11F of the base 11 projects over or beyond the edge 12A of the work bench 12. The base 11 has a rigid upstanding column 15 at its other or rear end, and as will be evident in Figs. 2 and 3 of the drawings this column 15 is afforded by a pair of laterally spaced upright plates 15R and 15L that are rigidly secured at their lower ends to the base 11 as by welding. The space between the plates 15R and 15L is utilized for mounting of a main pressure lever 20 that is disposed in a generally horizontal relation between the upper ends of the plates 15R and 15L and is pivotally supported by such plates by a transverse pivot pin 21. The pressure lever 20 has one arm 20F that extends forwardly to a point over or opposite the forward end 11F of the base 11, and it is by downward movement of the arm 20F toward the base portion 11F that the tension testing forces are applied.

Under and in accordance with the present invention, such testing force is applied in such a way that the apparatus may be used to test valve springs in position in a motor, or may be used for bench testing of either valve springs or piston rings. In attaining this novel and advantageous result, the testing force is applied to the element under test between the base portion 11F and an adjustable force transmitting and applying element that is associated with the arm 20F. Thus a transmitting rod 25 is afforded which has a somewhat pointed upper end 25U adapted to engage a downwardly facing socket 20S formed in the lower face of the arm 20F adjacent the forward end thereof. The rod 25 extends downwardly through a guide opening 26 formed in forward portion 11F of the base 11. The arrangement is such that when the rod 25 is thus positioned, it is located so as to be substantially perpendicular to the base 11; and the testing force is applied to the element to be tested, such as a valve spring S, by disposing such element between the base 11 and an adjustable abutment member 30 mounted adjustably on the rod 25.

As will hereinafter become apparent, the testing operation is completed when the arm 20F is disposed in a horizontal position, or in other words when this arm is in a position parallel to the base 11. When this condition is attained, a locating mark M that is formed in the rod 25 is disposed with the lower edge thereof aligned with the upper face of the base 11, and this mark M is therefore disposed in a predetermined distance MD from the lower face of the arm 20F. The provision of the mark M on the force applying rod 25 enables the abutment member 30 to be readily adjusted to any desired test dimension TD, as indicated in Figs. 1 and 7 of the drawings, and this test dimension TD is the dimension of the resilient element, such as a valve spring S, that is to be produced in such element at the time when the force measurement is to be taken. Such adjustment of the abutment or force applying member 30 is attained by screw threading the rod 25 in the upper portion thereof as indicated on 25T, and the abutment member 30 in the present case is formed by a washer, as shown in Figs. 1 and 7, having a nut 30N secured thereto as by welding for operative engagement with the screw thread, 25T.

The abutment member 30 may be adjusted to the desired position along the rod 25 so as to afford the desired test dimension TD, and this is accomplished while the rod 25 is removed from its position beneath the force applying arm 20F. The article such as a spring S that is to be tested may then be put into position about the lower end position of the rod 25 so that the upper end of the spring S engages the lower face of the abutment 30, and the lower end of the rod is then projected downwardly through the guide opening 26 and the spring S is compressed in an amount sufficient to enable the upper end 25U of the rod 25 to be moved into position in the socket 20S of the arm 20F. The valve spring S then occupies the relationship shown in Fig. 1, and the testing action is attained by rocking the force applying arm 20F from the position shown in Fig. 1 to the position shown in Fig. 7, wherein the mark M is aligned with the upper face of the base 11.

Such testing action is applied under the present invention by means that enable the testing force to be readily determined, and to this end the testing apparatus of the present invention is arranged so that the force may be applied by means of a conventional torque wrench TW. Torque wrenches are conventionally arranged so that the reading is afforded showing the number of foot-pounds of force applied at the central axis of the wrench, and under the present invention, the force applied at the central axis of the torque wrench is transmitted to the force applying arm 20F in such a way that the normal scale that is afforded on the torque wrench so as to read any foot-pounds will give an accurate reading in pounds as to the force applied by the arm 20F to the resilient element that is being tested. Broadly stated, this advantageous result is attained by applying or transmitting the force from the axis of the torque wrench through a force transmitting lever system that is the equivalent of a one-foot arm extended from the axis of the torque wrench. It will be evident, of course, that the various forms of lever systems or force-transmitting arrangements might be employed, but under and in accordance with the present invention, a force transmitting system has been developed which attains transmission of the force in a desired ratio while at the same time enabling the testing apparatus to be relatively compact in character.

In attaining such force transmission the apparatus of the present invention has a lower lever 35 pivoted at 36 between the two uprights 15R and 15L, and at the forward end of the lever 35 and immediately forwardly of the column 15, the lever 35 has an enlarged head 37 having a squared socket 38 formed therein to receive the transmitting element of the torque wrench TW. The lever 35 has a rearwardly projecting arm 35R which is arranged to be disposed beneath the rearwardly projecting arm 20R of the upper lever 20, and a force-transmitting strut in the form of a rod 40 has its tapered upper and lower ends disposed within locating sockets formed in the adjacent faces of the arms 20R and 35R respectively. It will be recognized of course that the strut or rod 40 constitutes a force transmitting connection between the levers 35 and 20, and although the rod 40 that is herein shown, acts in compression to transmit the testing force, it will be apparent that a link acting in tension between the forward end portions of the levers 20 and 35 could accomplish this same purpose within the scope of the present invention.

The torque wrench TW may of course be of any desired type, but as herein shown this torque wrench TW has a force-applying head 42 having a squared axial projection 42P that may be inserted into the squared opening 38. A force applying arm 43 extends from the head 42 in an upward direction, as shown in Fig. 1, and has a handle 43H thereon so that this handle may be grasped to apply force to the wrench. The rod 43 has a transverse indicator plate 44 fixed thereon and this plate has a scale 44S formed thereon so as to read in foot-pounds. The scale 44S is arranged to cooperate with a pointer 45 that is fixed on the head 42 of the wrench so that it normally is parallel to the force applying rod 43. When, however, the wrench is in use, the rod 43 is bent so as to move the scale 44S relative to the pointer 45, and this gives the reading as to the force in foot-pounds that is being applied at the axis of the head 42 of the wrench.

When the force is thus applied to the head 42 of the wrench TW as indicated by the arrow in Fig. 1, the lever 35 is rocked in a counterclockwise direction, and the rod 40 is forced upwardly, thereby to rock the arm 20F in a clockwise direction from the position shown in Fig. 1 to the position shown in Fig. 7. The lever arms that are afforded on the opposite ends of the levers 20 and 35 are so proportioned and related that an effective lever arm of one-foot is attained in the force transmission system between the axis of the head 42 of the torque wrench and the socket 20S, and hence the reading that is attained on the scale 40S under such circumstances constitutes a reading in pounds as to the force applied in compressing the spring S or the like to the test dimension TD.

It will be recognized that under some circumstances it may be difficult to determine when the spring S or the like has been compressed to the desired test dimension TD, and this is particularly true where the test is to be performed by a single worker, for under such circumstances the worker would not only need to observe the location of the mark M, but would also need to read the scale 44S, and because of this, indicating means are provided which enable the worker to constantly watch the scale 44S and to take the reading when such indicating means indicates that the desired test dimension has been attained in the article that is being tested. For this purpose, a stationary arm 50 is secured as by welding on the forward edge of the upright 15R adjacent to the upper end thereof, and this stationary arm extends forwardly toward the outer or forward end of the arm 20F. On this forwardly extending stationary arm 50 a signal lever 51 is pivotally mounted on a pivot screw 52, and the forward end of the indicating lever 51 has a downwardly tapering surface 51S that is arranged to be engaged by an adjustable lug 54. The lug 54 is secured by means of a screw 55 to the adjacent side on the face of the arm 20F, and the lug 54 is so adjusted that when the arm 20F is in its initial or elevated position of Fig. 1, the lug 54 will engage the surface 51 and hold the signal lever 51 in its upper position of Fig. 1. As the test operation proceeds, the lug 54 rides downwardly along the surface 51S, and when the arm 20S attains its horizontal position shown in Fig. 7, the lug 54 is arranged to ride off of the end 51E of the surface 51S, as indicated in Fig. 7, of the drawings, and this allows the indicating lever 51 to drop to the dotted line position shown in Fig. 7. When this occurs, a lug 57, that is adjustably secured on the other or rear end of the lever 51 by a screw 58, is arranged to strike the arm 43 of the torque wrench TW, and this serves to stop the movement of the torque wrench, thereby to simplify the taking of the reading on the scale 44S.

It has been pointed out hereinbefore that the testing apparatus 10 of the present invention may be utilized either for bench testing of valve springs, or for the testing of such valve springs while the springs are in position in a motor, and through this arrangement it is possible to test such valve springs while they are at their normal working temperatures. Thus, as illustrated in Figs. 4 and 5 of the drawings, a motor 60 is illustrated in which the valves 61 are urged upwardly by valve springs, S2, and are actuated in the opposite direction by valve rockers 62. In motors of this character, there is ordinarily a cover 64 that is held in place by two or more securing screws 65 that extend upwardly from the brackets 66 that support the rocker arms. When the cover 64 has been removed, the screws or bolts 65 are utilized to afford a mounting for a supporting plate 68 which is held in the desired vertical position by nuts 69 on the screws 65. The supporting plate 68 may thus serve as a mounting for the testing apparatus 10 which may be secured in any desired position along the supporting plate 68 by means such as a clamp 70. The testing apparatus 10 may thus be mounted in such a position that the rod 25 thereof is aligned with one of the valve stems, and when thus located, the lower end of the rod 25 may be moved downwardly into engagement with the upper face of the rocker arm 62. Hence by operation of the torque wrench TW, the rod 25 may be moved downwardly to compress the valve spring S2, and the required test dimension for the spring S2 may be attained either by adjusting the vertical location of the supporting plate 68, or by affording a rod 25 of the necessary length. It will be observed that the ability of the present testing apparatus to test valve springs in position in the motor is imparted to the testing apparatus by reason of the slidable projection of the rod 25 downwardly through the guide opening 26 in the base 11 of the apparatus. After a particular valve spring has thus been tested, the clamp 70 may be released and the testing apparatus put in position opposite another one of the springs S2.

It has also been pointed out hereinbefore that the testing apparatus 10 may be utilized to test piston rings, and this test with the present apparatus may be performed while the rings are in position on a piston 75 such as that shown in Fig. 6 of the drawings. Thus the piston 75 may have a plurality of piston rings 76 mounted thereon, and the ends of these piston rings are normally separated as indicated at 76A in Fig. 6. When a test is to be performed with respect to such piston rings, these rings are compressed until the ends thereof are in contact as indicated at 76B in Fig. 6, and such compression of the piston rings may be accomplished with the present testing apparatus in a simple and expeditious manner. Thus rod 25 may, for such a testing operation, be equipped with a fitting 80 having a screw threaded head 80A thereon which is threaded onto the upper portion of the rod 25. The fitting 80 has a laterally projecting arm 80B and a downwardly projecting end 80C, and this end 80C is disposed against the upper surface of the piston ring 76 that is to be tested while the lower surface of this ring rests upon the forward portion 11F of the base. The testing apparatus is then operated to apply compressive force to the piston ring, and such compression is continued until the ends of the piston ring are engaged as indicated at 76B, at which time the reading on the scale of the torque wrench TW is taken. In performing such a test the operator may rely upon observation of the relationship of the adjacent ends of the ring that is being tested to determine when the pressure reading is to be taken, or the fitting 80 may be adjusted so as to enable the signal arm 51 to be utilized.

From the foregoing description it will be apparent that the present invention greatly simplifies the testing operations that are to be performed in garages and machine shops with respect to resilient machine parts such as piston rings and valve springs. Moreover, it will be apparent that under the present invention a tension testing apparatus is afforded which is simple and relatively compact in character, and under the present invention the arrangement is such that a normal scale of a torque wrench may be utilized to afford a direct reading in pounds as to the tension applied to the article that is being tested. I have determined experimentally that this result is attained when the dimensions of the parts are as follows:

| | Inches |
|---|---|
| Center of opening 38 to axis of pivot 36 | 1 |
| Axis of rod 40 to axis of pivot 36 | 7/8 |
| Axis of rod 40 to axis of pivot 21 | 5/8 |
| Axis of rod 25 to axis of pivot 21 | 5 7/16 |

The foregoing dimensional relationship affords an effective lever arm of one foot between the axis of the socket 38 and the axis of the rod 25, and hence the direct reading characteristics are attained while at the same time affording a compact and conveniently operable testing unit.

Hence, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a tension testing apparatus for testing the tension characteristics of resilient machine elements such as valve springs, piston rings and the like, a flat base having an upstanding column at one end thereof and adapted to be secured in position on a support with the other end of said base projecting beyond said base in an overhanging relation, said other end of said base having a guide opening therein, a pressure applying arm pivoted on said column in upwardly spaced relation with respect to said base and being extended in a direction generally parallel to said base to dispose the remote end of said arm over and in alignment with said guide opening, and a pressure applying rod slidably extended through said guide opening for engagement of its lower end with a rocker arm when a valve spring is to be tested in position in an engine, the upper end of said rod being engaged with and laterally guided by said remote end of said pressure arm, said rod having a pressure applying fitting screw-threaded thereon for adjustment to a desired test dimension, and means for applying and measuring rocking test forces to said pressure applying arm.

2. In a tension testing apparatus for testing the tension characteristics of resilient machine elements such as valve springs, piston rings and the like, a flat base having an upstanding column at one end thereof and adapted to be secured in position on a support with the other end of said base projecting beyond said base in an overhanging relation, said other end of said base having a guide opening therein, a pressure applying arm pivoted on said column in upwardly spaced relation with respect to said base and being extended in a direction generally parallel to said base to dispose the remote end of said arm over and in alignment with said guide opening, and a pressure applying rod slidably extended through said guide opening for engagement of its lower end with a rocker arm when a valve spring is to be tested in position in an engine, the upper end of said rod being engaged with and laterally guided by said remote end of said pressure arm, and said rod having a pressure applying fitting screw-threaded thereon for adjustment to a desired test dimension, means affording a socket adapted to receive the output element of a torque wrench, and means for transmitting the torque from said socket to said arm dimensioned to apply such torque to said rod through an effective arm of one foot so as thereby to enable the torque scale of such wrench to afford a reading in pounds as to the force applied to said rod.

3. In a tension testing apparatus for testing the tension characteristics of resilient machine elements such as valve springs, piston rings and the like, a flat base having an upstanding column at one end thereof and adapted to be secured in position on a support with the other end of said base projecting beyond said base in an overhanging relation, said other end of said base having a guide opening therein, a pressure applying arm pivoted on said column in upwardly spaced relation with respect to said base and being extended in a direction generally parallel to said base to dispose the remote end of said arm over and in alignment with said guide opening, and a pressure applying rod slidably extended through said guide opening for engagement of its lower end with a rocker arm when a valve spring is to be tested in position in an engine, the upper end of said rod being engaged with and laterally guided by said remote end of said pressure arm, a pressure applying fitting screw-threaded on said rod for adjustment to a desired test dimension, means for applying and measuring rocking test forces to said pressure applying arm, a stationary arm extended from said column to a point adjacent to said remote end of said arm, a stop lever pivoted on said stationary arm, and an operating lug on said remote end of said force applying arm and operable to control said stop lever to cause operation of said stop lever when an element being tested has been compressed to the desired test dimension.

4. In a tension testing apparatus for testing the tension characteristics of resilient machine elements such as valve springs, piston rings and the like, a flat base having mounting means at one end thereof and adapted to be secured in position on a support with the other end of said base projecting beyond said base in an overhanging relation, said other end of said base having a guide opening therein, a pressure applying arm pivoted on said mounting means and having a remote end spaced substantially from said base and disposed over and in alignment with said guide opening, and a pressure applying rod slidably extended through said guide opening for engagement of its lower end with a rocker arm when a valve spring is to be tested in position in an engine, the upper end of said rod being engaged with and laterally guided by said remote end of said pressure arm, said rod having a pressure applying fitting screw-threaded thereon for adjustment to a desired test dimension, and means for applying and measuring rocking test forces to said pressure applying arm.

NORMAN B. WEYAND.

REFERENCES CITED

The following references are of record in the file of this patent:

UNITED STATES PATENTS

| Number | Name | Date |
|---|---|---|
| 1,760,602 | McKinney | May 27, 1930 |
| 2,170,197 | Gumprich | Aug. 22, 1939 |
| 2,291,561 | Reiss | July 28, 1942 |
| 2,340,277 | Sturtevant | Jan. 25, 1944 |